(12) United States Patent
Chow et al.

(10) Patent No.: US 7,192,559 B2
(45) Date of Patent: Mar. 20, 2007

(54) METHODS AND DEVICES FOR HIGH THROUGHPUT FLUID DELIVERY

(75) Inventors: Andrea W. Chow, Los Altos, CA (US); Anne R. Kopf-Sill, Portola Valley, CA (US); J. Wallace Parce, Palo Alto, CA (US); Robert S. Dubrow, San Carlos, CA (US)

(73) Assignee: Caliper Life Sciences, Inc., Mountain View, CA (US)

( * ) Notice: Subject to any disclaimer, the term of this patent is extended or adjusted under 35 U.S.C. 154(b) by 745 days.

(21) Appl. No.: 09/922,224

(22) Filed: Aug. 2, 2001

(65) Prior Publication Data

US 2002/0125139 A1 Sep. 12, 2002

Related U.S. Application Data

(60) Provisional application No. 60/222,884, filed on Aug. 3, 2000.

(51) Int. Cl.
*B01L 3/02* (2006.01)
*B01L 11/00* (2006.01)
*B32B 5/02* (2006.01)
*B32B 27/04* (2006.01)
*B32B 27/12* (2006.01)

(52) U.S. Cl. .................. 422/100; 422/50; 422/55; 422/58; 422/63; 422/68.1; 422/81; 422/82; 422/101; 422/102; 422/103; 422/104; 436/43; 137/87.01; 137/88; 137/89; 137/98; 137/99

(58) Field of Classification Search .................. 422/50, 422/55, 58, 63, 68.1, 81, 82, 100, 101, 102, 422/103, 104; 137/87.01, 88, 89, 98, 99
See application file for complete search history.

(56) References Cited

U.S. PATENT DOCUMENTS

| 4,390,403 A | 6/1983 | Batchelder |
| 4,908,112 A | 3/1990 | Pace |

(Continued)

FOREIGN PATENT DOCUMENTS

WO    WO 96/04547    2/1996

(Continued)

OTHER PUBLICATIONS

Cohen, C.B. et al., "A Microchip-Based Enzyme Assay for Protein Kinase A," *Anal. Chem.* (1999) 273:89-97.

(Continued)

*Primary Examiner*—Brian Sines
(74) *Attorney, Agent, or Firm*—Donald R. McKenna; Ann C. Petersen

(57) ABSTRACT

Methods and devices for delivering fluids into microfluidic device body structures are described. The methods and devices include the use of fluid manifolds which are integrated or interchangeable with device body structures. Methods of fabricating manifolds are also provided.

36 Claims, 5 Drawing Sheets

U.S. PATENT DOCUMENTS

| | | | |
|---|---|---|---|
| 5,126,022 | A | 6/1992 | Soane et al. |
| 5,250,263 | A | 10/1993 | Manz |
| 5,498,392 | A | 3/1996 | Wilding et al. |
| 5,571,410 | A | 11/1996 | Swedberg et al. |
| 5,585,069 | A | 12/1996 | Zanzucchi et al. |
| 5,587,128 | A | 12/1996 | Wilding et al. |
| 5,593,838 | A | 1/1997 | Zanzucchi et al. |
| 5,603,351 | A | 2/1997 | Cherukuri et al. |
| 5,635,358 | A | 6/1997 | Wilding et al. |
| 5,637,469 | A | 6/1997 | Wilding et al. |
| 5,640,995 | A * | 6/1997 | Packard et al. ............ 137/597 |
| 5,699,157 | A | 12/1997 | Parce |
| 5,750,015 | A | 5/1998 | Soane et al. |
| 5,779,868 | A | 7/1998 | Parce et al. |
| 5,800,690 | A | 9/1998 | Chow et al. |
| 5,842,787 | A | 12/1998 | Kopf-Sill et al. |
| 5,846,396 | A | 12/1998 | Zanzucchi et al. |
| 5,852,495 | A | 12/1998 | Parce |
| 5,863,708 | A | 1/1999 | Zanzucchi et al. |
| 5,869,004 | A | 2/1999 | Parce et al. |
| 5,876,675 | A | 3/1999 | Kennedy |
| 5,880,071 | A | 3/1999 | Parce et al. |
| 5,882,465 | A | 3/1999 | McReynolds |
| 5,885,470 | A | 3/1999 | Parce et al. |
| 5,942,443 | A | 8/1999 | Parce et al. |
| 5,948,227 | A | 9/1999 | Dubrow |
| 5,955,028 | A | 9/1999 | Chow |
| 5,957,579 | A | 9/1999 | Kopf-Sill et al. |
| 5,958,203 | A | 9/1999 | Parce et al. |
| 5,958,694 | A | 9/1999 | Nikiforov |
| 5,959,291 | A | 9/1999 | Jensen |
| 5,961,932 | A | 10/1999 | Ghosh et al. |
| 5,964,995 | A | 10/1999 | Nikiforov et al. |
| 5,965,001 | A | 10/1999 | Chow et al. |
| 5,965,410 | A | 10/1999 | Chow et al. |
| 5,972,187 | A | 10/1999 | Parce et al. |
| 5,976,336 | A | 11/1999 | Dubrow et al. |
| 5,989,402 | A * | 11/1999 | Chow et al. ................ 204/601 |
| 6,001,231 | A | 12/1999 | Kopf-Sill |
| 6,004,515 | A | 12/1999 | Parce et al. |
| 6,011,252 | A | 1/2000 | Jensen |
| 6,012,902 | A | 1/2000 | Parce |
| 6,042,710 | A | 3/2000 | Dubrow |
| 6,046,056 | A | 4/2000 | Parce et al. |
| 6,068,752 | A | 5/2000 | Dubrow et al. |
| 6,071,478 | A | 6/2000 | Chow |
| 6,074,725 | A | 6/2000 | Kennedy |
| 6,080,295 | A | 6/2000 | Parce et al. |
| 6,117,290 | A * | 9/2000 | Say et al. ................... 600/352 |
| 6,123,798 | A | 9/2000 | Gandhi et al. |
| 6,132,685 | A * | 10/2000 | Kercso et al. ............. 422/104 |
| 6,149,787 | A | 11/2000 | Chow et al. |
| 6,156,181 | A | 12/2000 | Parce et al. |
| 6,167,910 | B1 * | 1/2001 | Chow ......................... 137/827 |
| 6,251,343 | B1 | 6/2001 | Dubrow et al. |
| 6,287,438 | B1 | 9/2001 | Knoll |
| 6,890,493 | B1 * | 5/2005 | Bergh et al. ................ 422/130 |

FOREIGN PATENT DOCUMENTS

| | | |
|---|---|---|
| WO | WO 97/02357 | 1/1997 |
| WO | WO 98/00231 | 1/1998 |
| WO | WO 98/00705 | 1/1998 |
| WO | WO 98/00707 | 1/1998 |
| WO | WO 98/02728 | 1/1998 |
| WO | WO 98/05424 | 2/1998 |
| WO | WO 98/22811 | 5/1998 |
| WO | WO 98/45481 | 10/1998 |
| WO | WO 98/45929 | 10/1998 |
| WO | WO 98/46438 | 10/1998 |
| WO | WO 98/49548 | 11/1998 |
| WO | WO 98/55852 | 12/1998 |
| WO | WO 98/56956 | 12/1998 |
| WO | WO 99/00649 | 1/1999 |
| WO | WO 99/10735 | 3/1999 |
| WO | WO 99/12016 | 3/1999 |
| WO | WO 99/16162 | 4/1999 |
| WO | WO 99/19056 | 4/1999 |
| WO | WO 99/19516 | 4/1999 |
| WO | WO 99/29497 | 6/1999 |
| WO | WO 99/43432 A1 | 9/1999 |
| WO | WO 99/56954 | 11/1999 |
| WO | WO 00/09753 | 2/2000 |
| WO | WO 01/14064 | 3/2001 |
| WO | WO 01-77641 A1 | 10/2001 |

OTHER PUBLICATIONS

Dasgupta, P.K. et al., "Electroosmosis: A Reliable Fluid Propulsion System for Flow Injection Analysis," *Anal. Chem.* (1994) 66:1792-1798.

Jacobson, S.C. et al., "Fused Quartz Substrates for Microchip Electrophoresis," *Anal. Chem.* (1995) 67:2059-2063.

Manz, A. et al., "Electroosmotic pumping and electrophoretic separations for miniaturized CWchemical analysis systems," *J. Micromech. Microeng.* (1994) 4:257-265.

Ramsey, J.M. et al., "Microfabricated chemical measurement systems," *Nature Med.* (1995) 1:1093-1096.

Seiler, K. et al., "Planar Glass Chips for Capillary Electrophoresis: Repetitive Sample Injection, Quantitation, and Separation Efficiency," *Anal. Chem.* (1993) 65:1481-1488.

Seiler, K. et al., "Electroosmotic Pumping and Valveless Control of Fluid Flow Within a Manifold of Capillaries on a Glass Chip," *Anal. Chem.* (1994) 66:3485-3491.

Sundberg, S. A., "High-throughput and ultra-high-throughput screening: solution—and cell-based approaches," *Current Opinions in Biotechnology* 2000, 11:47-53.

* cited by examiner

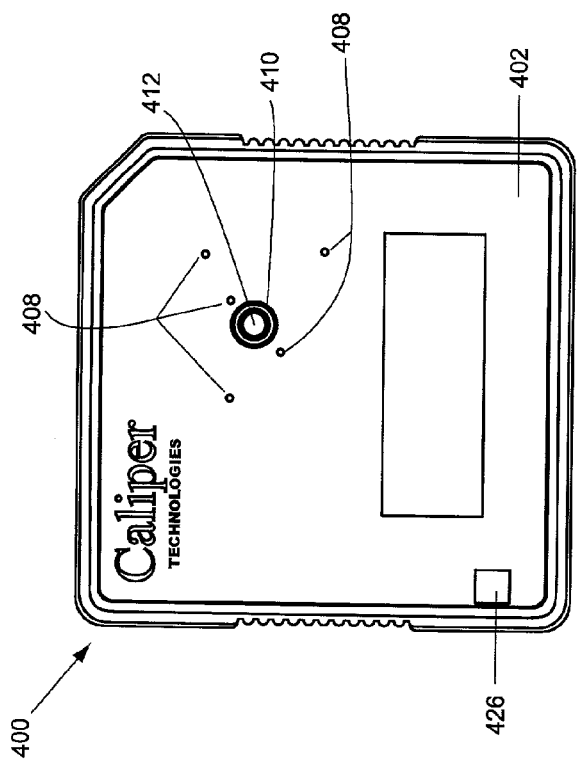
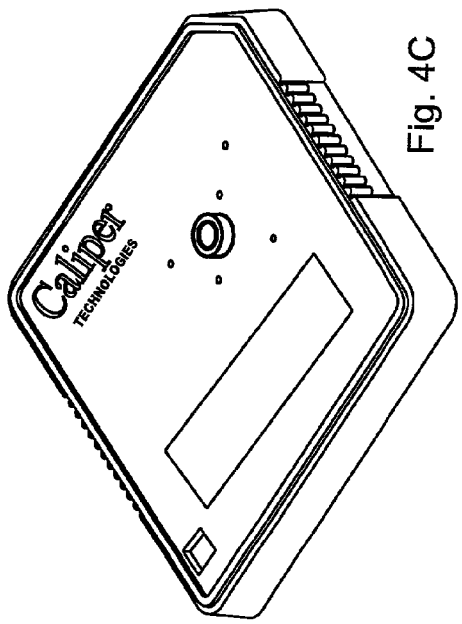
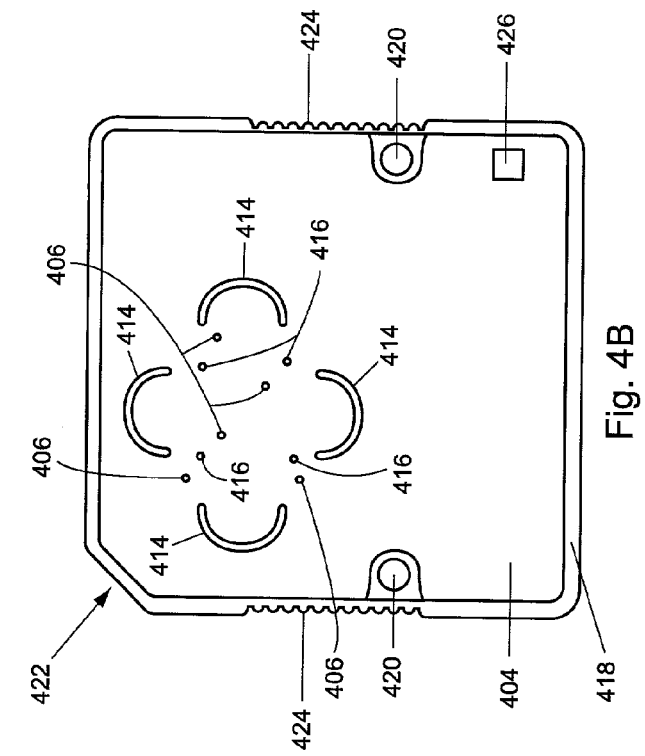
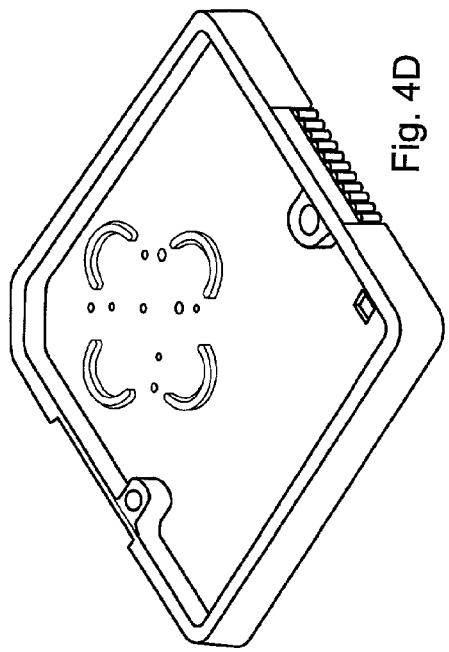
Fig. 4A
Fig. 4B
Fig. 4C
Fig. 4D

METHODS AND DEVICES FOR HIGH THROUGHPUT FLUID DELIVERY

CROSS-REFERENCES TO RELATED APPLICATIONS

Pursuant to 35 U.S.C. §§ 119 and/or 120, and any other applicable statute or rule, this application claims the benefit of and priority to U.S. Ser. No. 60/222,884, filed on Aug. 3, 2000, the disclosure of which is incorporated by reference.

COPYRIGHT NOTIFICATION

Pursuant to 37 C.F.R. §1.71(e), Applicants note that a portion of this disclosure contains material which is subject to copyright protection. The copyright owner has no objection to the facsimile reproduction by anyone of the patent document or patent disclosure, as it appears in the Patent and Trademark Office patent file or records, but otherwise reserves all copyright rights whatsoever.

BACKGROUND OF THE INVENTION

Modern pharmaceutical discovery often involves assaying or screening immense collections of test compounds for their effects on specific target molecules. Combinatorial chemistry and associated technologies for generating molecular diversity have significantly increased the number of test compounds available for such screening. In addition, genomic research has uncovered vast numbers of new target molecules against which the efficacy of these test compounds may be screened. However, the search for lead compounds in the development of these new pharmacological agents is often impeded by the lack of sufficient throughput of many assays. Sources which limit throughput include the time and labor requirements associated with preparing each screen.

Microfluidic systems are one set of tools that have greatly augmented drug discovery processes. For example, certain multiplexed device formats that include many parallel reaction channels within a single chip are generally well suited to perform high numbers of simultaneous analyses. These assays typically involve introducing assay components, such as reagents and buffers, into the reaction channels via access ports also disposed in chip surfaces, but which directly interface with the external environment. As more complex channel networks have been incorporated into these microfluidic devices, these access ports have been drawn in closer proximity to one another. As a result, fluid introduction into these devices, whether accomplished manually using, e.g., a pipettor, or automatically using, e.g., a robotic fluid handling device, is often a laborious process that consumes significant amounts of time.

As a consequence, improved devices and methods of fluid delivery would be desirable. The present invention is directed to these and other features by providing high-throughput fluid manifolds and to methods of using the same. The invention also relates to methods of manufacturing manifold systems.

These and many other attributes will be apparent upon complete review of the following disclosure.

SUMMARY OF THE INVENTION

The present invention generally relates to microfluidic device manifold systems and to methods of delivering reagents to microfluidic device components using the manifold systems. The invention additionally provides methods of fabricating manifolds for microfluidic devices. One advantage of the invention includes decreasing assay preparation time since reagents are typically loaded only one time for distribution to selected ports rather than multiple times to each of those ports individually. This may also help to conserve reagents which are often limited in supply. The invention additionally simplifies instrument design and provides for more reliable results by reducing the number of pressure/vacuum and/or the number of electrode interfaces with a particular device.

In particular, the present invention provides a microfluidic device that includes a body structure having a microchannel network and a plurality of ports disposed in the body structure. At least one port is in fluid communication with a microchannel in the microchannel network. The device also includes a manifold having a manifold channel network and an aperture disposed in the manifold. The aperture is in fluid communication with a manifold channel in the manifold channel network. Additionally, the manifold is mated with the body structure such that the aperture or one or more manifold channels in the manifold channel network is in fluid communication with one or more of the plurality of ports. The microchannel network disposed in the body structure typically extends in a substantially planar dimension, while the manifold channel network disposed in the manifold includes channels extending both horizontally and vertically within the manifold. Optionally, the microchannel network and the manifold channel network extend in at least horizontal and vertical planes.

In preferred embodiments, the aperture is in fluid communication with two or more manifold channels in which at least two of the two or more manifold channels also fluidly communicate with a different port. The devices of the present invention also typically include an additional aperture or manifold channel in fluid communication with the aperture, with the at least one or another manifold channel network, or with the port, for venting air when the devices are loaded with reagents or filled with another fluidic material. The manifolds of the invention also optionally include a first alignment structure for aligning the body structure on the first surface of the manifold.

The invention also includes a controller/detector apparatus (e.g., an automated apparatus) configured to receive the microfluidic device. The controller/detector apparatus generally includes an optical and/or an electrochemical detection system and a material transport system. The detection system and the transport system are operably interfaced with the microfluidic device.

In one embodiment, the devices include two or more manifolds, in which each of the two or more manifolds interchangeably mates with the body structure for distributing a fluid to one or more of the plurality of ports in the body structure. In another embodiment, the invention provides two or more body structures, in which each of the two or more body structures interchangeably mates with the manifold for distributing a fluid to one or more of the plurality of ports in the body structure. These embodiments also typically include an automated controller/detector apparatus, similar to the apparatus mentioned above, but which additionally includes a body structure or manifold interchange system.

In certain embodiments of the present invention, the body structure and the manifold are integrated. For example, each of the body structure and the manifold generally separately include a first surface. The plurality of ports is optionally disposed in the first surface of the body structure. Additionally, the aperture or the one or more manifold channels in the manifold channel network are optionally disposed in the first surface of the manifold. Upon integration, the first surface of the manifold is typically mated to the first surface of the body structure such that the aperture or the one or more manifold channels in the manifold channel network are in fluid communication with the plurality of ports disposed in the body structure. The first surface of the body structure and the first surface of the manifold are typically planar. When the manifold and body structure are integrated, the first surface of the manifold is typically mated to the first surface of the body structure using, e.g., adhesion, heat lamination, bonding, welding, clamping, or the like.

In preferred embodiments, the manifold optionally includes two or more layers. The two or more layers, which are typically fabricated from at least one polymeric, glass, or ceramic material, are optionally bonded, adhered, welded, or clamped together. Optionally, at least two of the two or more layers are fabricated from different polymeric, glass, or ceramic materials. Also, the two or more layers are alternatively approximately the same thickness, or at least two of the two or more layers are different thicknesses. As used herein, "thickness" refers to the depth or height, as opposed to the length or width, e.g., of a manifold or a layer of a manifold. Furthermore, the manifold optionally includes at least about 3, or at least about 5, or at least about 10 layers in which the manifold channel network and the aperture are disposed.

The microfluidic devices of the present invention also include other alternative embodiments. These include delivering electrical fields to the ports and microchannels of a device body structure by disposing a bulk viscosity enhancer and an electrolyte in the aperture and/or manifold channel network of a manifold that is mated with the body structure.

Electrical fields are also optionally delivered to a body structure using various conductive coatings. For example, each of the plurality of ports generally includes a rim disposed circumferentially around each port in the first surface of the body structure and an internal surface, in which a portion of the rim and the internal surface of at least one of the plurality of ports includes a conductive coating. The manifold also typically includes a second surface opposite the first surface, in which the aperture is disposed in the second surface and in fluid communication with a manifold channel in the manifold channel network. The second surface of the manifold is typically planar. The aperture also typically includes a rim disposed circumferentially around the aperture in the second surface and an internal surface, in which a portion of the rim and the internal surface of the aperture include a conductive coating.

Additionally, a semi-permeable membrane portion is optionally disposed between a portion of the first surface of the manifold and the first surface of the body structure when the first surface of the manifold and the first surface of the body structure are mated. The semi-permeable membrane portion is disposed between the aperture or the one or more manifold channels in the manifold channel network and the plurality of ports disposed in the body structure, e.g., to sieve particle aggregates.

Other embodiments include the use of rings, e.g., to prevent adhesives from contacting reagents flowed from manifold channels and/or apertures into the ports of a body structure. This option typically includes disposing a ring between the manifold and the body structure and circumferentially around the aperture when the aperture is aligned with at least one of the plurality of ports in the body structure. Furthermore, a gasket is optionally disposed between a portion of the first surface of the manifold and the first surface of the body structure.

The present invention also relates to methods of distributing a fluid to a plurality of ports disposed in a body structure of a microfluidic device. The methods include loading the fluid into a first aperture in a manifold of the microfluidic device. The microfluidic device includes the manifold and the body structure.

Additionally, the manifold also includes a manifold channel network disposed therein, in which the first aperture is in fluid communication with one or more manifold channels in the manifold channel network. Furthermore, the first aperture or manifold channel is in fluid communication with the plurality of ports. A microchannel network is also in fluid communication with the plurality of ports. The methods further include flowing the fluid using a fluid direction component from the first aperture through the manifold channel network such that the fluid is distributed to the plurality of ports disposed in the body structure of the microfluidic device. The methods also optionally include interchangeably mating manifolds and body structures.

In certain embodiments, a portion of the microchannel network includes a plurality of parallel microchannels and the methods additionally include flowing the fluid from the first aperture into the plurality of parallel microchannels or into one or more ports in fluid communication with the plurality of parallel microchannels. For example, the plurality of parallel microchannels optionally include at least about 6, 12, 24, 48, 96, or more parallel microchannels. The methods also include assaying the fluid for detectable properties in each of the plurality of parallel microchannels simultaneously. Optionally, the methods include detecting the detectable properties in a common detection region of the plurality of parallel microchannels using a detector in or proximal to the plurality of parallel microchannels in the common detection region. The methods also optionally include detecting the detectable signal in each of the plurality of parallel microchannels simultaneously in the common detection region.

The present invention also includes methods of fabricating a manifold for a microfluidic device. The methods include forming one or more layers using a fabrication process to include an aperture disposed in the one or more layers. The aperture is in fluid communication with one or more manifold channel networks disposed in at least one of the one or more layers, in which the manifold is structurally configured to mate with a body structure of the microfluidic device. The methods include optionally bonding, adhering, welding, or clamping the two or more layers together such that the aperture is in fluid communication with the one or more manifold channel networks disposed in at least one of the two or more layers.

BRIEF DESCRIPTION OF THE FIGURES

FIGS. 4A–D illustrate one embodiment of the assembled two layered manifold shown in FIG. 3 from various viewpoints.

DETAILED DESCRIPTION OF THE INVENTION

Figure 1:
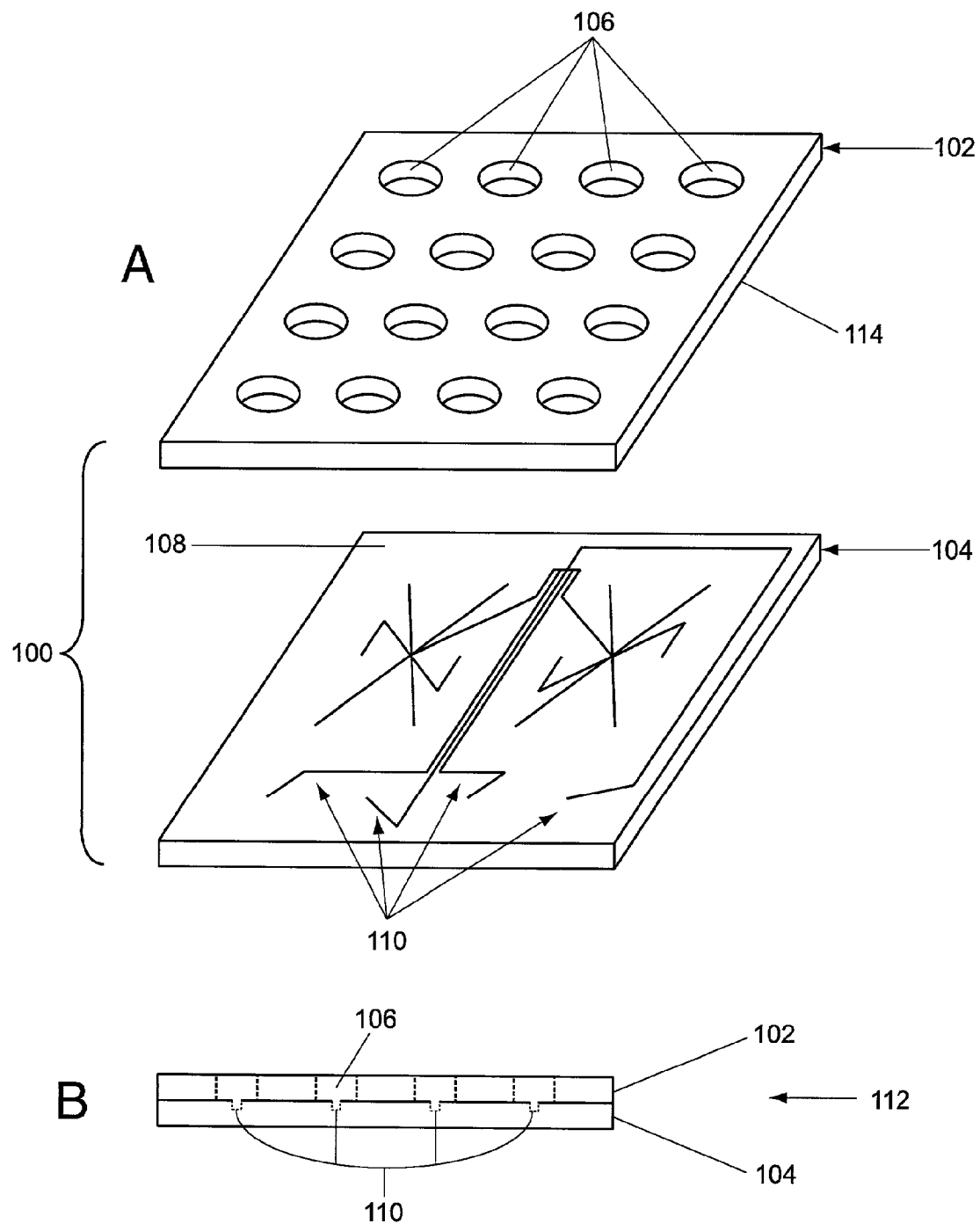
FIGS. 1A and B illustrate an embodiment of an unassembled and an assembled body structure of a microfluidic device.

The present invention generally relates to fluid manifold systems and to improved methods of fluid delivery. In particular, the present invention is directed to manifold devices and to methods of utilizing those devices to deliver reagents or other fluid components to microfluidic device components. The invention also provides methods for fabricating manifolds for microfluidic devices.

In general, manifolds typically include three dimensional fluid distribution systems, such as apertures and/or manifold channel networks that interface external reagent reservoirs, wells, or ports disposed in surfaces of microfluidic device body structures. Body structures generally include at least one microchannel network that intersects with at least one port. Microchannel networks typically extend in a substantially planar dimension, which imposes certain topological constraints on fluid delivery. The manifolds of the present invention remove these constraints such that a single reagent well or aperture in the manifold fluidly communicates with, e.g., a large number of parallel microchannels disposed within a microfluidic chip. This decreases assay preparation time because reagents are only loaded once instead of multiple times, thus leading to higher throughput and to less reagent consumption.

Manifolds and body structures are optionally integrated or interchangeable. As used herein, an "integrated manifold" refers to a single manifold that is bonded, adhered, welded, clamped, or otherwise integrated with a single microfluidic device body structure. That is, integrated manifolds are not interchangeable with other device body structures. In contrast, an "interchangeable manifold" refers to a single manifold that is optionally mated or otherwise operably interfaced with more than one microfluidic device body structure (e.g., in series), e.g., to deliver fluids to each body structure.

In either format, this layer of interfacing a microfluidic device body structure with the external environment facilitates the scalability of multiplexed microfluidic devices or chips having a large number of parallel microchannels without increasing proportionately the number of ports accessed by the outside world. The planar microfluidic device body structures or chips of the present invention have at least one, but typically a plurality of access ports which fluidly communicate with one or more microscale channel networks, conduits, and/or chambers fabricated within each microfluidic device body structure. Access ports are generally positioned in a top surface of a body structure or chip, e.g., when the device is oriented for typical operational usage, and are optionally used to introduce various fluids (e.g., reagents, buffers, etc.), electrical fields, fluid transport components, or the like. These planar microfluidic device body structures also optionally include one or more capillary elements extending from, e.g., a bottom surface (opposite the top surface) of the structures and which fluidly communicate with the microchannels and/or other cavities disposed within the devices. Capillary elements are also typically used to introduce fluid components into the devices.

Other advantages of the invention include that the device interface with equipment hardware, e.g., vacuum and/or pressure sources, electrodes, or the like, is unchanged regardless of the number of parallel microchannels incorporated into a single body structure. As a result, as mentioned above, these devices are easily scalable. In addition, the pattern of ports disposed in the surface of a particular microfluidic device body structure does not need to exactly mirror the pattern of apertures or manifold channel termini that emerges from a given manifold structure. In turn, the same pattern of body structure ports is optionally cost effectively mass produced for use with any manifold system. To further decrease manufacturing costs, manifold channels are optionally fabricated with dimensions that are larger than those at the microscale. Furthermore, manifolds provide well or aperture locations that are adequately spaced to avoid optical detection interference.

The following provides details regarding various aspects of the methods and devices of manifold-based fluid delivery. It also provides details pertaining to the methods of fabricating fluid manifold systems.

Fluid Delivery Devices

The present invention generally relates to microfluidic device manifold systems that include microfluidic body structures and manifolds. In particular, the present invention provides a microfluidic device that includes a body structure having a microchannel network and a plurality of ports disposed in the body structure. At least one port is in fluid communication with a microchannel in the microchannel network. Materials and fabrication methods used to produce microfluidic body structures as well as other related features are described further below.

FIG. 1A illustrates one embodiment of a body structure of a microfluidic device, prior to assembly, which incorporates a planar, layered structure. As shown, unassembled body structure 100 includes upper layer 102 and lower layer 104. Upper layer 102 includes plurality of ports 106 fabricated through the layer. Upper surface 108 of lower layer 104 is fabricated to include grooves and/or wells 110. Lower surface 114 of upper layer 102 is then mated (e.g., thermally bonded, ultrasonically welded, etc.) to upper surface 108 of lower layer 104 such that grooves and/or wells 110 define channels (e.g., microchannels), conduits, and/or chambers, within the interior of the aggregate body structure, which fluidly communicate with plurality of ports 106. FIG. 1B illustrates assembled body structure 112.

As indicated, the microfluidic devices of the invention also include manifolds for delivering fluids to the device body structures. A manifold generally includes at least one, but typically more than one manifold channel network and at least one aperture disposed in the manifold. Manifold channels in the at least one manifold channel network disposed in the manifold typically include a cross-sectional dimension of at least about 5 μm, 10 μm, 50 μm, 100 μm, 250 μm, 500 μm, 1,000 μm, 5,000 μm, or more. The aperture is typically in fluid communication with at least one manifold channel in a manifold channel network. Apertures also generally include a depth of at least about 1 mm, 5 mm, 10 mm, 100 mm, or more and have a volume of at least about 1 μl, 10 μl, 100 μl, 1,000 μl, or more.

A manifold is typically mated with a body structure such that the aperture or one or more manifold channels in the manifold channel network is in fluid communication with one or more of the plurality of ports disposed in the body structure. In certain embodiments, manifolds are integrated with body structures (e.g., adhered (e.g., using glue, tape, pressure sensitive adhesive, uv curable adhesive, etc.), heat laminated, welded, bonded, clamped, or the like). In other embodiments, more than one manifold is optionally used to deliver fluids to a particular body structure, or multiple body structures are optionally interfaced with a particular manifold for fluid delivery to each individual body structure.

Alternatively, multiple manifolds are interchanged with multiple body structures in accordance with the particular application (e.g., high-throughput screening of large numbers of test compounds, etc.). These latter embodiments generally involve an automated manifold/body structure interchange system. All of these methods of mating manifolds with body structures are discussed in greater detail below. See, e.g., Published PCT Application No. WO 99/43432.

In preferred embodiments, an aperture is in fluid communication with two or more manifold channels in which at least two of the two or more manifold channels also fluidly communicate with a different port. Optionally, each of the two or more manifold channels also fluidly communicates with a different port. As a result, manifolds are optionally designed for delivering fluids to any combination of ports on a particular body structure. For example, a manifold is optionally designed to deliver fluid to as few as one to as many as all 16 ports, or any combination of ports therebetween, included in the body structure embodiment illustrated in FIGS. 1A and 1B (i.e., on a 16 port device). Manifolds are optionally designed for use with essentially any body structure embodiment that includes one or more ports, reservoirs, wells, and/or comparable access components. Furthermore, although any number of apertures are optionally included in the manifolds of the present invention, one significant advantage of these manifold systems is that as few as one aperture is optionally included for delivering fluids to any number/combination of ports included in a particular body structure.

Prior to assembly, the manifolds of the present invention optionally include two or more layers. The two or more layers, which are typically fabricated from at least one polymeric, glass, or ceramic material, are optionally bonded, adhered, welded, bonded, or clamped together. Optionally, at least two of the two or more layers are fabricated from different polymeric, glass, or ceramic materials. Furthermore, the two or more layers are alternatively approximately the same thickness, or at least two of the two or more layers are different thicknesses. For example, at least one of the two or more layers of the manifold optionally includes a thickness of at least about 1 µm, 10 µm, 100 µm, 1 mm, 5 mm, 1 cm, or more. Manifolds optionally include at least about 3, or at least about 5, or at least about 10 layers in which manifold channel networks and apertures are disposed. Additionally, the manifold (e.g., when constructed as a single layer) or the two or more layers of the manifold (e.g., in multi-layered manifolds) are optionally fabricated using a process selected from, e.g., injection molding, cast molding, compression molding, extrusion, embossing, etching, or the like.

The manifold fluid distribution system components (e.g., the series of fluidly communicating manifold channels, apertures, and/or manifold cavities) optionally include various dimensions. As mentioned above, for example, manifold channels optionally include a cross-sectional dimension of at least about 5 µm, 10 µm, 50 µm, 100 µm, 250 µm, 500 µm, 1,000 µm, 5,000 µm, or more. At manifold channel cross-sectional dimensions of less than, e.g., about 50 µm, the manifold channels function as additional microfluidic components, because at these dimensions manifold channels have the same hydrodynamic and electrical resistance characteristics as the channels or other cavities disposed in device body structures. However, manifold components are optionally designed to provide negligible hydrodynamic and electrical resistances such that only the dimensions of the microchannels disposed within the body structures control the microfluidic function. These design considerations typically utilize manifold channel dimensions that are at least 50 µm or at least 100 µm in at least one cross-sectional dimension, or more preferably at least an order of magnitude larger than analysis microchannels disposed in the body structures. These dimensions are adequately large to use standard polymer processing technologies, such as some of those mentioned above (e.g., injection molding, compression molding, extrusion, embossing, etc.) to fabricate the multi-layer manifold structure for fluid distribution of reagents and buffers. These polymer processing technologies are typically technically less difficult and more cost effective than techniques used to form smaller scale channels or other cavities.

Figure 2:
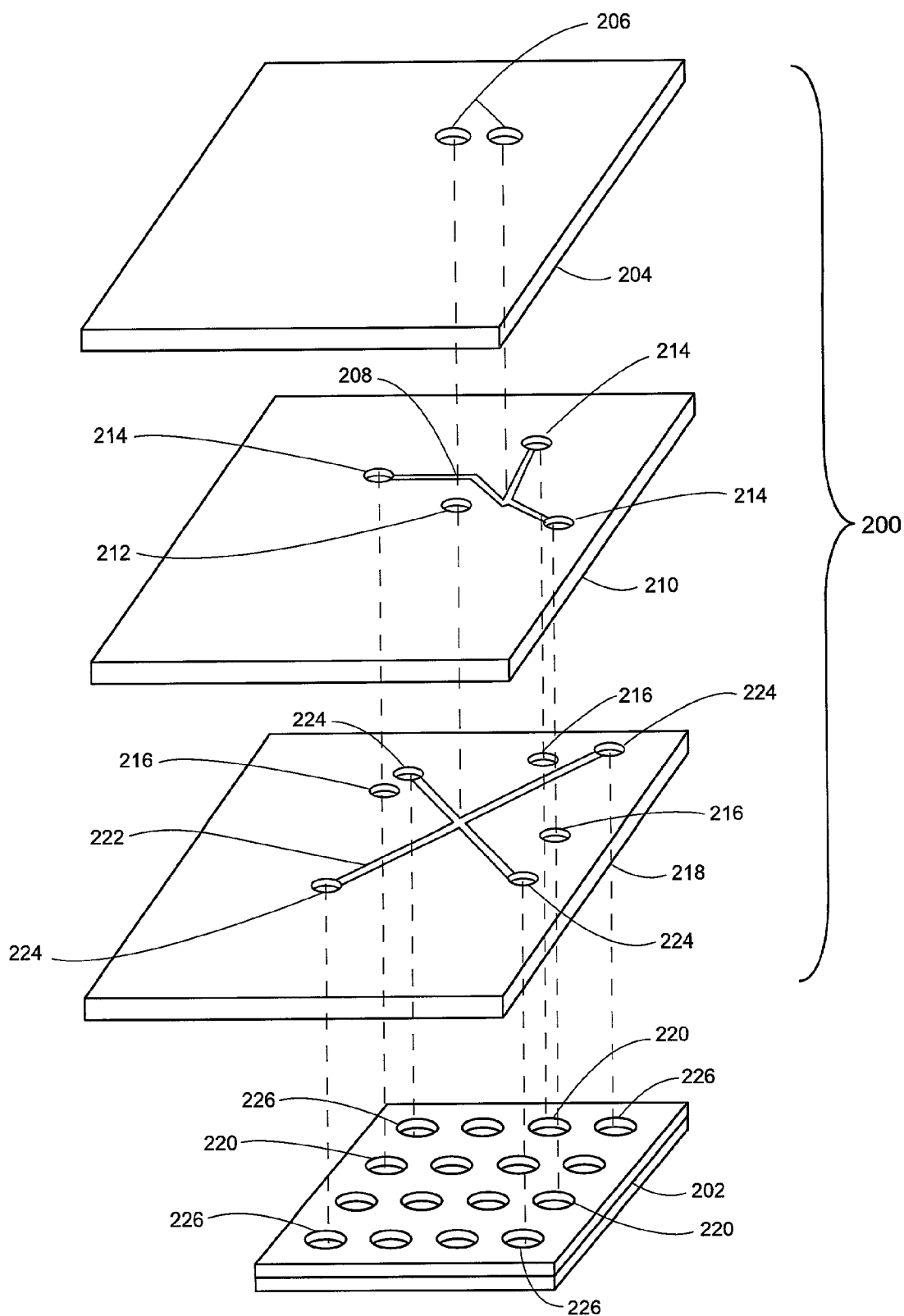
FIG. 2 illustrates the unassembled components of a three-layered manifold for delivering fluid to seven different ports in a body structure.

A multi-layered manifold fluid distribution system is illustrated in FIG. 2, which depicts the unassembled components of three layered manifold 200 for delivering fluid to seven different ports in body structure 202. As shown, top manifold layer 204 includes two apertures 206, one of which will fluidly communicate with middle layer manifold channel network 208 in middle manifold layer 210, while the other will fluidly communicate with aperture 212 in middle manifold layer 210. The manifold channels of middle layer manifold channel network 208 also fluidly communicate with three apertures 214 in middle manifold layer 210, which will fluidly communicate with three apertures 216 in bottom manifold layer 218. Three apertures 216 will also fluidly communicate with three ports 220 of body structure 202. Aperture 212 in middle manifold layer 210 will fluidly communicate with bottom layer manifold channel network 222. The manifold channels of bottom layer manifold channel also fluidly communicate with four apertures 224 in bottom manifold layer 218, which will fluidly communicate with four ports 226 in body structure 202. As a result, after manifold 200 is assembled, fluids are optionally loaded into one or both of two apertures 206 for distribution to either ports 220 and/or ports 226 in body structure 202. As mentioned, the fluid manifolds of the present invention dramatically decrease assay preparation times, because reagents or other fluids are typically loaded only one time rather than multiple times for distribution to selected ports on a particular body structure.

The devices of the present invention also typically include an additional aperture (e.g., paired apertures, etc.) or manifold channel in fluid communication with the aperture, with the at least one or another manifold channel network, or with the port, for venting air when the devices are loaded with reagents and facilitate quick replacement of reagents.

Figure 3:
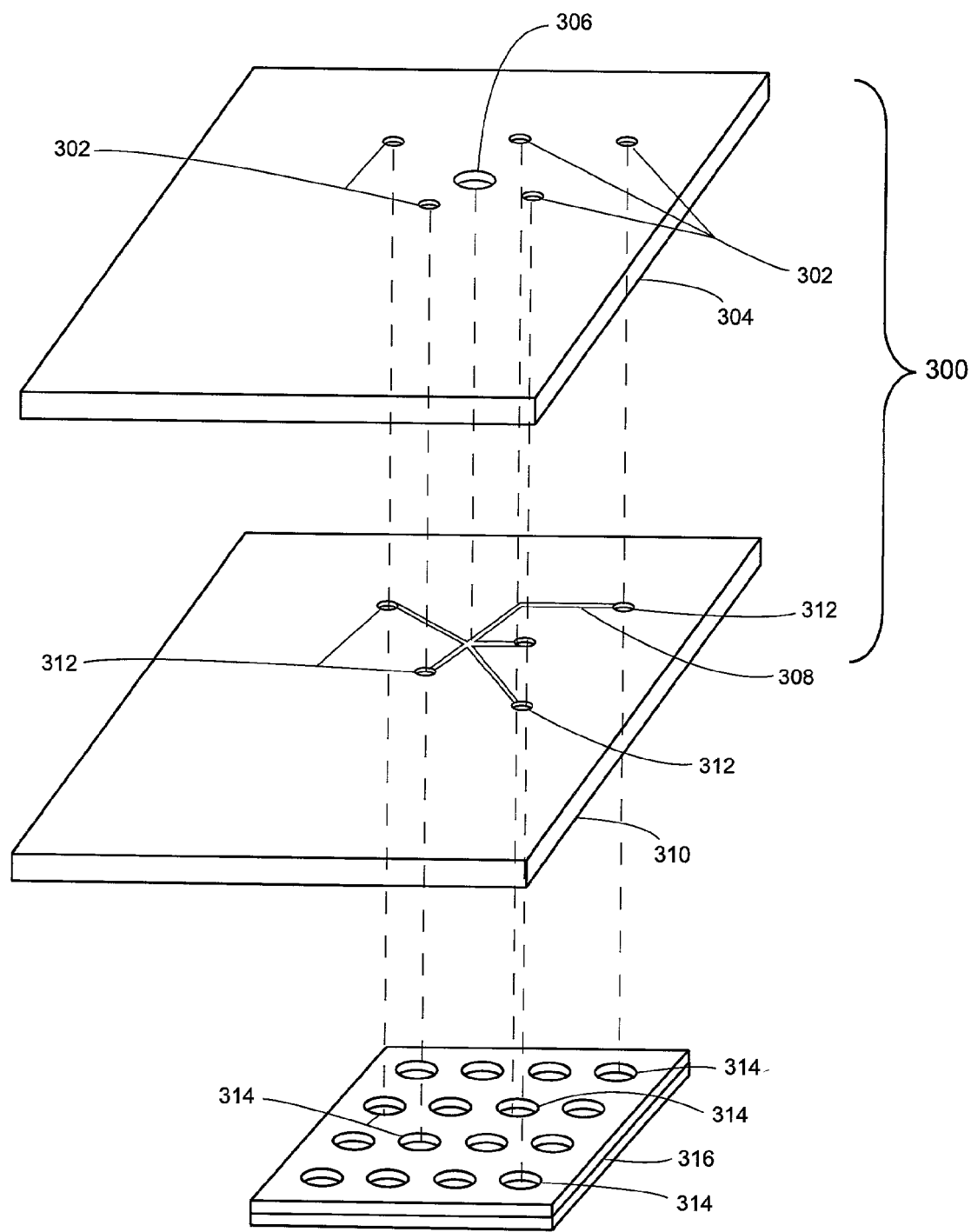
FIG. 3 illustrates the unassembled components of a two-layered manifold that includes venting apertures for venting air from the device during fluid delivery to a body structure.

One embodiment of this is illustrated in FIG. 3, which schematically depicts the unassembled components of two layered manifold 300, which includes venting apertures 302. As shown, top manifold layer 304 includes aperture 306 and five venting apertures 302. Aperture 306 will fluidly communicate with bottom layer manifold channel network 308 which is disposed in, e.g., a surface of bottom manifold layer 310. The manifold channels of bottom layer manifold channel network 308 also fluidly communicate with five apertures 312 in bottom manifold layer 310, which will fluidly communicate with five ports 314 disposed in body structure 316. Five venting apertures 302 disposed through top manifold layer 304 will fluidly communicate with five apertures 312 such that in the assembled manifold when fluid is flowed into aperture 306 and through bottom layer manifold channel network 308 to five apertures 312 air is vented out of manifold 300 through five venting apertures 302.

FIG. 4 illustrates one embodiment of the assembled manifold shown unassembled in FIG. 3 from the top (FIG.

4A), bottom (FIG. 4B), top perspective (FIG. 4C) and bottom perspective views (FIG. 4D). As shown, manifold 400 is planar in shape having upper planar surface 402 and lower planar surface 404. Also included are apertures 406 disposed in lower planar surface 404 which fluidly communicate with a manifold channel network (not shown) contained within manifold 400 and with venting apertures 408 disposed in upper planar surface 402. As mentioned with respect to FIG. 3, apertures 406 are positioned within lower planar surface 404 so as to align with selected ports/reservoirs in the body structure of a microfluidic device when that body structure is mated to lower planar surface 404 of manifold 400.

The devices of present invention also include many other embodiments, which are optionally used alone or in combination with one another. For example, although not shown, rings are optionally disposed between and surrounding the aligned apertures and ports to, e.g., prevent adhesive (e.g., uv curable adhesive, etc.) from getting into the ports and in turn from contacting assay components in the ports. Semipermeable membranes (not shown) are also optionally disposed between aligned apertures and ports for use in controlling material compositions within the devices, such as by sieving aggregations of materials (e.g., clumps of cells, particles, reagents, etc.) and delivering material into the devices. Conductive coatings are also optionally used, e.g., to minimize cross-contamination among devices when electrical fields are delivered into devices. All of these features are described in greater detail in, e.g., U.S. patent application Ser. No. 09/544,711 to Dubrow et al. entitled "Microfluidic Devices and Systems Incorporating Cover Layers," which was filed Apr. 6, 2000 and which is incorporated by reference herein in its entirety for all purposes.

In other embodiments, aperture 412, the manifold channel network (not shown), and apertures 416 also include a bulk viscosity enhancer and an electrolyte (e.g., a salt, a buffering ionic species, etc.) disposed therein for delivering electrical fields to device body structures. (FIG. 4). A "bulk viscosity enhancer," as used herein, includes molecules capable of increasing the bulk viscosity of a solution. Suitable bulk viscosity enhancers include aqueous-based solutions of single polymers, polymer mixtures, copolymers, block copolymers, polymer micellar systems, interpenetration polymer networks, or the like. The diffusive mobility of the electrolyte is substantially unaffected by the increase in bulk hydrodynamic resistance within the microscale cavity, e.g., due to the small size of the electrolyte relative to the hydrodynamic radius of the bulk viscosity enhancer. As a result, low electrical resistance is induced in the microfluidic device. The use of bulk viscosity enhancers and electrolytes in delivering electrical fields is described in greater detail in, e.g., Provisional U.S. patent application Ser. No. 60/203,498 by Chow et al., entitled "Microfluidic Devices and Methods to Regulate Hydrodynamic and Electrical Resistance Utilizing Bulk Viscosity Enhancers," filed May 11, 2000, which is incorporated by reference herein in its entirety for all purposes.

As also shown in FIG. 4, annular ridge 410 is optionally provided on upper planar surface 402 of manifold 400, surrounding aperture 412. This ridge provides a barrier between neighboring reservoirs (when present) and also functions to increase the effective volume of each reservoir in the device. The walls of aperture 412 and a rim disposed in annular ridge 410 also optionally include a conductive coating, e.g., for delivering an electrical field into the device.

FIG. 4 also illustrates that lower planar surface 404 of manifold 400, typically has fabricated thereon, a series of raised ridges 414, which function as alignment structures to ensure the body structure of the microfluidic device (such as the body structure shown in FIG. 3), is properly aligned with manifold 400 during, e.g., bonding or interchange processes. Although illustrated as ridges, it will be understood that a number of different alignment structures are optionally provided upon lower planar surface 404 for aligning the body structure of the device with manifold 400. For example, a recessed region, which is configured to fit the body structure is optionally used, whereby placement of the body structure into the recessed region positions the body structure to be appropriately aligned with apertures 406 in manifold 400. Alternatively, alignment pins are provided extending from the lower surface, against which the body structure is optionally positioned, when appropriately aligned with manifold 400.

Also optionally included on lower planar surface 404 of manifold 400 are small high spots 414. These high spots, or bumps, maintain the body structure in a position slightly set off of lower planar surface 404 when the body structure is mated with manifold 400. The small set off resulting from high spots 414 allows a bonding adhesive material to wick into the space between the body structure and manifold 400 in embodiments where the body structure and manifold are integrated.

As shown, manifold 400 includes side-walls 418, which extend from lower planar surface 404, effectively creating a hollow-backed structure. (FIG. 4). This hollow-backed structure permits the mounting or mating of a body structure of a microfluidic device to lower planar surface 404 of manifold 400 without altering the overall profile of manifold 400, e.g., permitting the combined device-manifold to be laid flat upon a surface or stacked with other like devices, as well as providing benefits in manufacturing, e.g., curing/hardening of molded parts, etc.

In addition to providing alignment structures for mounting a body structure to manifold 400, as shown, manifold 400 also optionally includes additional alignment structures 420 and 422. (FIG. 4). These alignment structures permit the appropriate alignment of the overall device into an appropriate base unit, such as a controller/detector instrument (not shown). In particular, alignment holes 420 provided disposed at least partially through manifold 400 are complementary to alignment pins that are typically provided on a controller/detector instrument (not shown). By matching the pins of the controller/detector instrument (described further below) with alignment holes 420 on the overall device, one is assured of proper alignment of the device with the appropriate elements of the instrument, e.g., electrodes, optical detectors, thermal blocks, etc. In addition to alignment holes 420, manifold 400 also optionally includes beveled corner 422, which further ensures proper alignment of the device in the controller/detector instrument. Again, a number of different types of alignment structures are optionally used to accomplish this same purpose, including irregular edges (e.g., beveled, tabbed, etc.), alignment pins, non-uniform shapes, or the like.

As shown, manifold 400 also includes optional convenience features. For example, textured regions 424 are provided on side-walls 418, to provide gripping surfaces, e.g., for manual handling of manifold 400 or an integrated device. Also provided is registry port 426 disposed through manifold 400. Different numbers, sizes and/or shapes of registry ports are optionally provided in the cover layer to register the type of microfluidic device that has been inserted in a controller/detector instrument. This ensures that the proper interface is used and/or the proper control program is being run.

In general, the controller/detector apparatus, which is optionally an automated apparatus, is typically configured to receive the microfluidic device. The controller/detector apparatus generally includes an optical and/or an electrochemical detection system and a material transport system. Additionally, the detection system and the transport system are operably interfaced with the microfluidic device. Controller/detector instrumentation is described in greater detail below.

As mentioned, in certain embodiments of the present invention the body structure and the manifold are integrated. For example, each of the body structure and the manifold generally separately include a first surface. The plurality of ports is optionally disposed in the first surface of the body structure. Additionally, the aperture or the one or more manifold channels in the manifold channel network are optionally disposed in the first surface of the manifold. Upon integration, the first surface of the manifold is typically mated to the first surface of the body structure such that the aperture or the one or more manifold channels in the manifold channel network are in fluid communication with the plurality of ports disposed in the body structure. The first surface of the body structure and the first surface of the manifold are typically planar. When the manifold and body structure are integrated, the first surface of the manifold is typically mated to the first surface of the body structure using, e.g., adhesion, heat lamination, welding, clamping, or the like.

Figure 5:
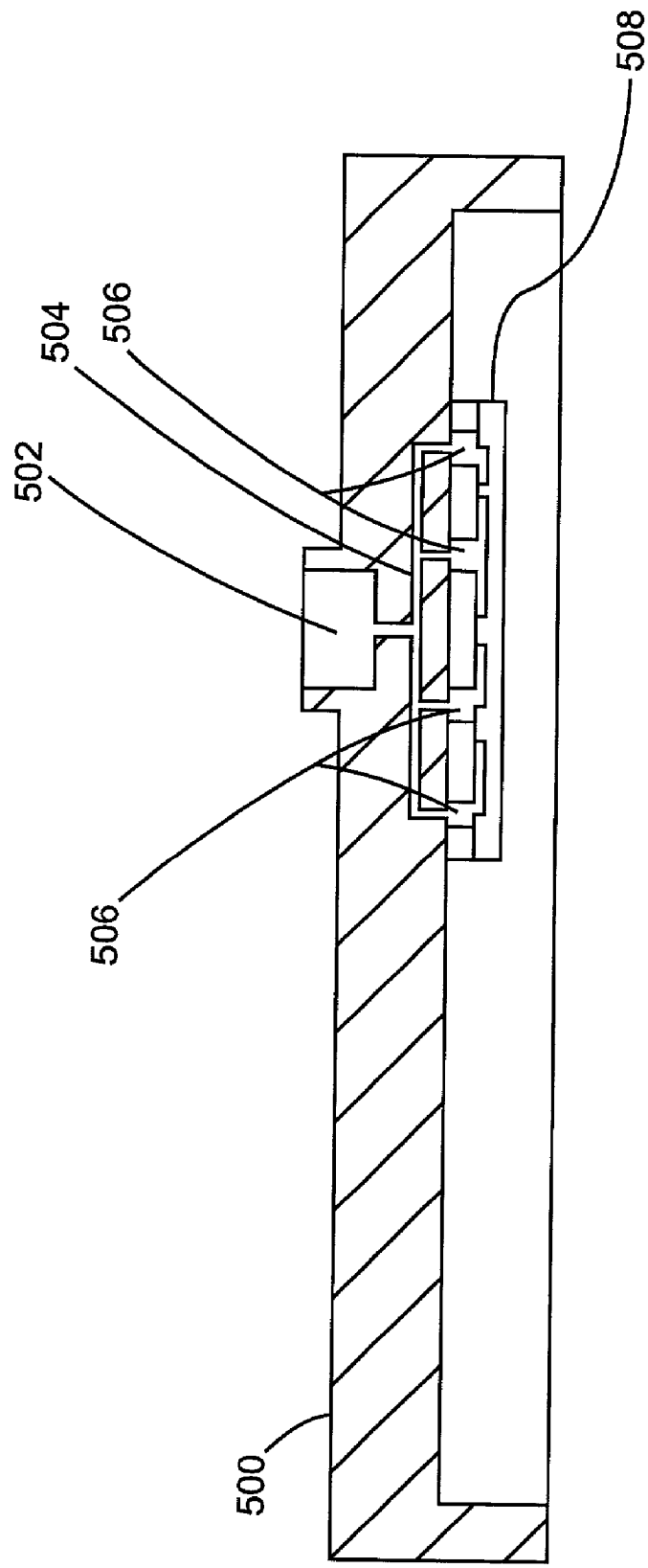
FIG. 5 illustrates a cross-section through a mated manifold and body structure.

A cross-section through an integrated manifold and body structure is depicted in FIG. 5. As shown, manifold 500 includes aperture 502 in fluid communication with manifold channel network 504, which in turn fluidly communicates with ports 506 disposed in integrated body structure 508. Ports 506 also fluidly communicate with microchannels 510 disposed within body structure 508.

In addition to the manifolds of the present invention, a separate cover layer component is also optionally included which interfaces with the surface of a manifold opposite the manifold/body structure interface. The optional cover layer component provides the capability to further increase the volume capacity of the manifold apertures. In particular, the cover layer typically includes one or more apertures which align with manifold apertures when the cover layer is mated with the manifold to increase the total depth of the manifold apertures. These and other cover layer embodiments which are optionally adapted to the devices of the present invention are described in greater detail in, e.g., Provisional U.S. patent application Ser. No. 60/203,498 by Chow et al., entitled "Microfluidic Devices and Methods to Regulate Hydrodynamic and Electrical Resistance Utilizing Bulk Viscosity Enhancers," filed May 11, 2000, which is incorporated by reference herein in its entirety for all purposes.

Methods of Fluid Delivery

The present invention also relates to methods of distributing a fluid to a plurality of ports disposed in a body structure of a microfluidic device. As mentioned, one significant advantage of the present invention is that manifolds are optionally designed such that a reagent or other fluid is loaded into an aperture one time for distribution to multiple ports, instead of delivering the fluid to each of the multiple ports by, e.g., pipetting into each individually. This feature of the invention increases the throughput of a given application, e.g., screening numerous test compounds when each assay utilizes the same reagents and/or buffers.

The methods typically include loading the fluid into a first aperture in a manifold of the microfluidic device. The microfluidic device includes the manifold and the body structure. Additionally, the manifold also includes a manifold channel network disposed therein, in which the first aperture is in fluid communication with one or more manifold channels in the manifold channel network. Furthermore, the first aperture or manifold channel is in fluid communication with the plurality of ports. Also, a microchannel network is in fluid communication with the plurality of ports. The methods also include flowing the fluid using a fluid direction component from the first aperture through the manifold channel network such that the fluid is distributed to the plurality of ports disposed in the body structure of the microfluidic device. In preferred embodiments, the methods of the invention include providing a second aperture or manifold channel in the manifold, in which the second aperture or manifold channel is in fluid communication with the first aperture, with the at least one or another manifold channel network, or with the plurality of ports, for venting air from the microfluidic device during the loading or the flowing steps.

In one embodiment, the methods include providing a second aperture or manifold channel in the manifold, in which the second aperture or manifold channel is in fluid communication with the plurality of ports, in which the second aperture or manifold channel include a bulk viscosity enhancer and an electrolyte disposed therein for delivering an electrical field to the plurality of ports during operation of the device. The use of bulk viscosity enhancers and electrolytes is discussed further above.

The methods also optionally include interchanging two or more body structures such that each body structure is sequentially mated to the manifold and flowing the fluid from the manifold to the plurality of ports disposed in each interchanged body structure. Optionally, at least one step in these methods is automated. A further option includes rotating either the particular body structure or the particular manifold relative to one another sequentially after individual fluid delivery steps for additional delivery combinations using the manifold pattern.

In certain preferred embodiments, a portion of the microchannel network includes a plurality of parallel microchannels (e.g., planar chips with multiplexed channel networks) and the methods additionally include flowing the fluid from the first aperture into the plurality of parallel microchannels or into one or more ports in fluid communication with the plurality of parallel microchannels. For example, the plurality of parallel microchannels optionally include at least about 6, 12, 24, 48, 96, or more parallel microchannels. The methods also include assaying the fluid for detectable properties in each of the plurality of parallel microchannels simultaneously. Optionally, the methods include detecting the detectable properties in a common detection region of the plurality of parallel microchannels using a detector in or proximal to the plurality of parallel microchannels in the common detection region. The methods also optionally include detecting the detectable signal in each of the plurality of parallel microchannels simultaneously in the common detection region. For additional discussion of parallel screening techniques, see, e.g., U.S. Pat. No. 6,046,056 to Parce, et al., entitled "High Throughput Screening Assay Systems in Microscale Fluidic Devices," which issued Apr. 4, 2000 and which is incorporated by reference herein in its entirety for all purposes.

In other embodiments of the methods, the loading step includes loading the fluid into the first aperture of each of two or more manifolds of the microfluidic device. Thereafter, the methods typically include interchanging the two or more manifolds such that each manifold is sequentially mated to the body structure and flowing the at least one fluid from each interchanged manifold to the plurality of ports disposed in the body structure of the microfluidic device. Optionally, at least one step in these methods is automated. The methods of the invention also optionally include mating the body structure sequentially to each of the two or more manifolds and flowing the least one fluid from each of the two or more manifolds to the plurality of ports disposed in the body structure of the microfluidic device.

The methods of the invention optionally include flowing a fluid in the manifold channel or microchannel networks using various fluid direction components that optionally include, e.g., a fluid pressure force modulator, an electrokinetic force modulator, a capillary force modulator, a gravity force modulator, a magnetic force modulator, a dielectrophoretic force modulator, a fluid wicking element, or the like. In preferred embodiments, fluid is flowed in the manifold channel network using a first gravity force modulator and in the at least one microchannel network using alternative fluid direction components that also optionally include a fluid pressure force modulator, an electrokinetic force modulator, a capillary force modulator, a second gravity force modulator, a magnetic force modulator, a dielectrophoretic force modulator, a fluid wicking element, or the like. The first and second gravity force modulators are optionally the same. Techniques of flowing fluids in the devices of the present invention are discussed further below.

In one embodiment, reagents are optionally first loaded directly into a device body structure followed by other fluidic materials (e.g., buffers or the like) which are delivered to the body structure through a manifold. This method helps to conserve reagents, which are often available only in limited amounts.

Integrated Systems

The manifolds of the present invention, whether fully integrated or interchangeable with one or more body structures, are optionally included as components of integrated systems to further enhance throughput. In one embodiment, for example, the devices include two or more manifolds, in which each of the two or more manifolds interchangeably mates with the body structure for distributing a fluid to one or more of the plurality of ports in the body structure. This embodiment typically also includes a controller/detector apparatus (e.g., an automated apparatus) configured to interchangeably receive the body structure or each of the two or more manifolds. This controller/detector apparatus typically includes an optical and/or an electrochemical detection system, a material transport system, and a body structure or manifold interchange system. The detection system, the transport system, and the body structure or manifold interchange system are generally operably interfaced with the microfluidic device.

In another embodiment, the invention provides two or more body structures, in which each of the two or more body structures interchangeably mates with the manifold for distributing a fluid to one or more of the plurality of ports in the body structure. This embodiment also generally includes a controller/detector apparatus (e.g., an automated apparatus) configured to interchangeably receive the two or more body structures or the manifold. The controller/detector apparatus also typically includes an optical and/or an electrochemical detection system, a material transport system, and a body structure or manifold interchange system. The detection system, the transport system, and the body structure or manifold interchange system are typically operably interfaced with the microfluidic device.

Instrumentation

The systems described herein generally include integrated fluid manifolds and/or interchangeable manifolds and body structures, as described above, in conjunction with additional instrumentation for dispensing fluids into manifolds, for orienting, mating, and/or interchanging the devices disclosed herein, for controlling electric fields, fluid transport, flow rate and direction within the devices, detection instrumentation for detecting or sensing results of the operations performed by the system, processors, e.g., computers, for instructing the controlling instrumentation in accordance with preprogrammed instructions, receiving data from the detection instrumentation, and for analyzing, storing and interpreting the data, and providing the data and interpretations in a readily accessible reporting format.

Controllers

A variety of controlling instrumentation is optionally utilized in conjunction with the microfluidic devices described above, for manipulating the manifolding systems of the invention, for controlling the delivery, transport, and direction of fluids and/or materials within the devices of the present invention, e.g., by pressure-based or electrokinetic control, or the like.

As described herein, in many cases, transport, concentration, and direction (e.g., reagents or other fluids) are controlled in whole or in part, using pressure based flow systems that incorporate external or internal pressure sources to drive fluid flow. Internal sources include microfabricated pumps, e.g., diaphragm pumps, thermal pumps, and the like that have been described in the art. See, e.g., U.S. Pat. Nos. 5,271,724, 5,277,556, and 5,375,979 and Published PCT Application Nos. WO 94/05414 and WO 97/02357. As also noted, the systems described herein also optionally utilize electrokinetic material direction and transport systems. In certain embodiments, gravity-based flow is used to induce fluid movement through the channels, apertures, or other chambers of manifolds, while other sources of fluid direction including pressure, electrokinetic, or other sources are used for fluid direction within device body structures.

Typically, the controller systems are appropriately configured to receive or interface with a microfluidic device or system element (e.g., an automated manifold/body structure interchange system), such as one or more manifolds and/or one or more body structures, as described herein. For example, the controller, interchanger and/or detector, optionally includes a stage upon which the integrated manifold or interchangeable components thereof are mounted to facilitate appropriate interfacing between the controller and/or detector and the device components. Typically, the stage includes an appropriate mounting/alignment structural element, such as a nesting well, alignment pins and/or holes, asymmetric edge structures (to facilitate proper device alignment), and the like. Many such configurations are described in the references cited herein.

The controlling instrumentation discussed above is also used to provide for electrokinetic injection or withdrawal of material downstream of the region of interest to control an upstream flow rate. The same instrumentation and techniques described above are also utilized to inject a fluid into a downstream port to function as a flow control element.

Detector

The devices herein optionally include optical, electrochemical, and/or other signal detectors which detect, e.g., concentration, fluorescence, phosphorescence, radioactivity, pH, charge, absorbance, refractive index, luminescence, temperature, magnetism, mass, or the like. The detector(s) optionally monitors one or a plurality of signals from upstream and/or downstream of an assay mixing point in which, e.g., a ligand and an enzyme are mixed. For example, the detector optionally monitors a plurality of optical signals which correspond in position to "real time" assay results.

Example detectors or sensors include photomultiplier tubes, CCD arrays, optical sensors, temperature sensors, pressure sensors, pH sensors, conductivity sensors, mass sensors, scanning detectors, or the like. Cells or other components which emit a detectable signal are optionally flowed past the detector, or, alternatively, the detector moves relative to the array to determine the position of an assay component (or, the detector optionally simultaneously monitors a number of spatial positions corresponding to channel regions, e.g., as in a CCD array). Each of these types of sensors is optionally readily incorporated into the microfluidic systems described herein. In these systems, such detectors are placed either within or adjacent to the microfluidic device or one or more channels, chambers or conduits of the device, such that the detector is within sensory communication with the device, channel, or chamber. The phrase "within sensory communication" of a particular region or element, as used herein, generally refers to the placement of the detector in a position such that the detector is capable of detecting the property of the microfluidic device, a portion of the microfluidic device, or the contents of a portion of the microfluidic device, for which that detector was intended. The detector optionally includes or is operably linked to a computer, e.g., which has software for converting detector signal information into assay result information (e.g., kinetic data of modulator activity), or the like. A microfluidic system optionally employs multiple different detection systems for monitoring the output of the system. Detection systems of the present invention are used to detect and monitor the materials in a particular channel region (or other reaction detection region).

The detector optionally exists as a separate unit, but is preferably integrated with the controller system, into a single instrument. Integration of these functions into a single unit facilitates connection of these instruments with the computer (described below), by permitting the use of few or a single communication port(s) for transmitting information between the controller, the detector and the computer.

Computer

As noted above, either or both of the controller system and/or the detection system is/are optionally coupled to an appropriately programmed processor or computer which functions to instruct the operation of these instruments in accordance with preprogrammed or user input instructions (e.g., interchanging manifolds and/or body structures, delivering selected amounts of fluidic reagents, etc.), receive data and information from these instruments, and interpret, manipulate and report this information to the user. As such, the computer is typically appropriately coupled to one or both of these instruments (e.g., including an analog to digital or digital to analog converter as needed).

The computer typically includes appropriate software for receiving user instructions, either in the form of user input into a set parameter fields, e.g., in a GUI, or in the form of preprogrammed instructions, e.g., preprogrammed for a variety of different specific operations. The software then converts these instructions to appropriate language for instructing the operation of the fluid direction, transport controller, and manifold/body structure interchange controller to carry out the desired operation, such as interfacing a manifold with a particular manifold channel pattern with a selected body structure or loading fluids into a manifold aperture. The computer then receives the data from the one or more sensors/detectors included within the system, and interprets the data, either provides it in a user understood format, or uses that data to initiate further controller instructions, in accordance with the programming, e.g., such as in monitoring and control of flow rates, temperatures, applied voltages, and the like.

In the present invention, the computer typically includes software for the monitoring of materials, such as reagent concentrations in the channels. Additionally, the software is optionally used to control pressure or electrokinetic modulated injection or withdrawal of material.

Manifold Fabrication

The present invention also includes methods of fabricating a manifold for a microfluidic device. In general, the methods include forming one or more layers using a fabrication process to include an aperture disposed in the one or more layers. Upon assembly, the aperture is in fluid communication with one or more manifold channel networks disposed in at least one of the one or more layers, in which the manifold is structurally configured to mate with a body structure of the microfluidic device. The methods include optionally bonding, adhering, welding, or clamping the two or more layers together such that the aperture is in fluid communication with the one or more manifold channel networks disposed in at least one of the two or more layers. The methods typically include forming the manifold to comprise one or more substantially planar layers. See, e.g., FIGS. 2 and 3, and the discussion related thereto. Additionally, the methods include forming the one or more layers using a fabrication process selected from, e.g., injection molding, cast molding, compression molding, extrusion, embossing, etching, or the like.

Individual manifold layers of the microfluidic devices described herein are generally fabricated from any of a number of different materials using various methods. For example, the materials and methods described below with respect to the manufacture of the microfluidic elements of body structures are also optionally employed in the manufacture of the manifold devices. As indicated above, while any these methods are effective, in preferred aspects, more conventional manufacturing techniques are used to produce manifolds. In particular, because manifolds generally do not need to be manufactured to the tolerances of the microfluidic elements of the devices of the invention, they are optionally manufactured using less precise or less time consuming techniques and/or from lower cost materials.

For example, in a layered microfluidic device fabricated from two glass layers, fabrication of the ports or reservoirs in one layer, e.g., by drilling or air abrasion techniques, typically takes a substantial amount of time. Further, the amount of time required for such fabrication increases in a non-linear, e.g., exponential, fashion with increasing substrate thickness. Conversely, reduction of substrate thickness reduces the amount of time required to fabricate the reservoirs, in an exponential fashion. Because a portion of the volume of the reservoirs in the final microfluidic device is optionally supplied by, e.g., the manifold element or an additional cover layer, the substrate layers used to fabricate the body structure of the microfluidic device are typically substantially thinner. Specifically, less of the total desired volume of the reservoir is a function of substrate thickness. As a result, fabrication time and cost associated with the manufacturing of reservoirs in the body structure are substantially reduced.

Typically, the manifold includes one or more injection molded polymeric or plastic parts (e.g., layers), fabricated from any of a number of different manufacturable plastics. For example, a manifold layer is typically fabricated from any of the polymeric materials described below for fabricating the body structure of the microfluidic device, e.g., polymethylmethacrylate (PMMA), polycarbonate, polytetrafluoroethylene (TEFLON™), polyvinylchloride (PVC), polydimethylsiloxane (PDMS), polysulfone, polystyrene, polymethylpentene, polypropylene, polyethylene, polyvinylidine fluoride, acrylonitrile-butadiene-styrene copolymer (ABS), and the like. In alternate aspects, manifold layers are optionally fabricated from non-polymeric materials, e.g., silica-based substrates, such as glass, quartz, silicon, as well as ceramics or metals.

Assembly of individual layers to form a functional manifold and/or attachment of the assembled manifold to the body structure of the device when the two are integrated is also typically accomplished by well known methods, including adhesive bonding, ultrasonic welding, solvent welding, thermal bonding, and the like. In preferred aspects, the manifold is attached to the body structure of the device using an adhesive material, and more preferably, uv curable adhesives are used to join the manifold structure with the body structure. Such adhesives are generally commercially available, e.g., from 3M Corporation. In particularly preferred aspects, the selected adhesive is electrically insulating, e.g., nonconductive, non-soluble and/or non-leaching in application buffers, low fluorescing, and the like.

As mentioned, in one embodiment, the microfluidic device includes a plurality of rings disposed around the reservoirs or ports in the microfluidic body structure underlying the integrated manifold. The rings are optionally molded around the apertures on the first surface of the manifold and integral with the manifold. Alternatively, the rings are molded around the ports disposed in the first surface of the body structure and integral with the body structure. As an additional alternative, the rings are separate from the manifold and the body structure. Upon attachment of the manifold to the body structure, a ring becomes disposed between each aperture and/or at least one manifold channel terminus aligned with each port.

The rings act to prevent adhesive, e.g., uv curable adhesive (mentioned above), from getting into the ports and in turn from contacting any assay components that are in the ports. As such, rings are optionally shaped as circular rings or as any other functionally equivalent forms, e.g., rectangular or polygonal rings. In the context of rings, the terms "thick" and/or "thickness" refer to the distance from an inner edge to an outer edge of a ring. A ring has a single thickness, as in the case of circular rings, or multiple thicknesses when other ring shapes are selected. However, each ring typically has a thickness in the range of from about 1 µM to about 1,000 µM. For example, the rings are optionally in the range of from about 50 µM to about 750 µM thick, e.g., about 500 µM thick. Larger rings typically result in the creation of voids around the ports/apertures. Narrower rings, e.g., in the range of from about 100 µM to about 500 µM are generally preferred.

The rings are optionally fabricated from many different materials. For example, if they are integral with the manifold or the body structure, they are made from the same material, and in the same step, as either of those two respective components. As discussed above, these optionally include a wide variety of polymeric and non-polymeric materials. If the rings are separate from the manifold and the body structure, they are also optionally fabricated from any of the polymeric or non-polymeric materials discussed above as well as others, including polymethylmethacrylate (PMMA), polycarbonate, polytetrafluoroethylene (TEFLON™), polyvinylchloride (PVC), polydimethylsiloxane (PDMS), polysulfone, polystyrene, polymethylpentene, polypropylene, polyethylene, polyvinylidine fluoride, acrylonitrile-butadiene-styrene copolymer (ABS), glass, quartz, silicon, gallium arsenide, silicon oxide, ceramics, metals, latex, silicone, or the like.

In alternate aspects, the body structure is attached to the manifold via a clamping mechanism. In such aspects, an optional flexible gasket, e.g., latex, silicone, etc., is placed between the upper surface of the body structure and the lower surface of the manifold. The flexible gaskets also optionally include the rings, discussed above, as integral components therein. The body structure is then compressively clamped against the manifold forming a sealed, joined structure. Suitable clamping mechanisms may be separate from the body structure/manifold assembly, i.e., screw clamps, clip-style clamps, e.g., that clamp the edges of the body structure and manifold, and the like. Alternatively, integrated clamping mechanisms are provided as a portion of the manifold, into which the body structure is snapped. The use of rings and gaskets is described in greater detail in, e.g., U.S. patent application Ser. No. 09/544,711 to Dubrow et al. entitled "Microfluidic Devices and Systems Incorporating Cover Layers," which was filed Apr. 6, 2000 and which is incorporated by reference herein in its entirety for all purposes.

Manifolds and Microfluidic Device Body Structures

The microfluidic device body structures of the present invention, as indicated, generally include various microscale components, such as microchannels or other conduits. While manifold apertures and channels are optionally manufactured at the microscale, to achieve some of the cost benefits discussed above, manifolds are typically fabricated with apertures and/or channels having dimensions (e.g., channel widths and/or heights) typically about an order of magnitude or more larger than body structure microchannels.

As used herein, the terms "microscale," "microfabricated" or "microfluidic" generally refer to one or more fluid passages, chambers or conduits which have at least one internal cross-sectional dimension, e.g., depth, width, length, diameter, etc., that is less than 500 µm, and typically between about 0.1 µm and about 500 µm. In the devices of the present invention, the microscale channels or chambers preferably have at least one cross-sectional dimension between about 0.1 µm and 200 µm, more preferably between about 0.1 µm and 100 µm, and often between about 0.1 µm and 20 µm. Accordingly, the microfluidic devices or systems prepared in accordance with the present invention typically include at least one microscale channel, usually at least two intersecting microscale channels, and often, three or more intersecting channels disposed within a single body structure. Channel intersections may exist in a number of formats, including cross intersections, "T" intersections, or any number of other structures whereby at least two channels are in fluid communication.

A variety of microscale systems are optionally adapted for use in the present invention, e.g., by incorporating integrated manifolds, interchangeable manifolds and/or body structures, manifolds/body structures exchange systems, or the like. These systems are described in numerous publications by the inventors and their coworkers, including certain issued U.S. Patents, such as U.S. Pat. Nos. 5,699,157 (J. Wallace Parce) issued Dec. 16, 1997, 5,779,868 (J. Wallace Parce et al.) issued Jul. 14, 1998, 5,800,690 (Calvin Y. H. Chow et al.) issued Sep. 01, 1998, 5,842,787 (Anne R. Kopf-Sill et al.) issued Dec. 01, 1998, 5,852,495 (J. Wallace Parce) issued Dec. 22, 1998, 5,869,004 (J. Wallace Parce et al.) issued Feb. 09, 1999, 5,876,675 (Colin B. Kennedy) issued Mar. 02, 1999, 5,880,071 (J. Wallace Parce et al.) issued Mar. 09, 1999, 5,882,465 (Richard J. McReynolds) issued Mar. 16, 1999, 5,885,470 (J. Wallace Parce et al.) issued Mar. 23, 1999, 5,942,443 (J. Wallace Parce et al.) issued Aug. 24, 1999, 5,948,227 (Robert S. Dubrow) issued Sep. 07, 1999, 5,955,028 (Calvin Y. H. Chow) issued Sep. 21, 1999, 5,957,579 (Anne R. Kopf-Sill et al.) issued Sep. 28, 1999, 5,958,203 (J. Wallace Parce et al.) issued Sep. 28, 1999, 5,958,694 (Theo T. Nikiforov) issued Sep. 28, 1999, 5,959,291 (Morten J. Jensen) issued Sep. 28, 1999, 5,964,995 (Theo T. Nikiforov et al.) issued Oct. 12, 1999, 5,965,001 (Calvin Y. H. Chow et al.) issued Oct. 12, 1999, 5,965,410 (Calvin Y. H. Chow et al.) issued Oct. 12, 1999, 5,972,187 (J. Wallace Parce et al.) issued Oct. 26, 1999, 5,976,336 (Robert S. Dubrow et al.) issued Nov. 2, 1999, 5,989,402 (Calvin Y. H. Chow et al.) issued Nov. 23, 1999, 6,001,231 (Anne R. Kopf-Sill) issued Dec. 14, 1999, 6,011,252 (Morten J. Jensen) issued Jan. 4, 2000, 6,012,902 (J. Wallace Parce) issued Jan. 11, 2000, 6,042,709 (J. Wallace Parce et al.) issued Mar. 28, 2000, 6,042,710 (Robert S. Dubrow) issued Mar. 28, 2000, 6,046,056 (J. Wallace Parce et al.) issued Apr. 4, 2000, 6,048,498 (Colin B. Kennedy) issued Apr. 11, 2000, 6,068,752 (Robert S. Dubrow et al.) issued May 30, 2000, 6,071,478 (Calvin Y. H. Chow) issued Jun. 6, 2000, 6,074,725 (Colin B. Kennedy) issued Jun. 13, 2000, 6,080,295 (J. Wallace Parce et al.) issued Jun. 27, 2000, 6,086,740 (Colin B. Kennedy) issued Jul. 11, 2000, 6,086,825 (Steven A. Sundberg et al.) issued Jul. 11, 2000, 6,090,251 (Steven A. Sundberg et al.) issued Jul. 18, 2000, 6,100,541 (Robert Nagle et al.) issued Aug. 8, 2000, 6,107,044 (Theo T. Nikiforov) issued Aug. 22, 2000, 6,123,798 (Khushroo Gandhi et al.) issued Sep. 26, 2000, 6,129,826 (Theo T. Nikiforov et al.) issued Oct. 10, 2000, 6,132,685 (Joseph E. Kersco et al.) issued Oct. 17, 2000, 6,148,508 (Jeffrey A. Wolk) issued Nov. 21, 2000, 6,149,787 (Andrea W. Chow et al.) issued Nov. 21, 2000, 6,149,870 (J. Wallace Parce et al.) issued Nov. 21, 2000, 6,150,119 (Anne R. Kopf-Sill et al.) issued Nov. 21, 2000, 6,150,180 (J. Wallace Parce et al.) issued Nov. 21, 2000, 6,153,073 (Robert S. Dubrow et al.) issued Nov. 28, 2000, 6,156,181 (J. Wallace Parce et al.) issued Dec. 5, 2000, 6,167,910 (Calvin Y. H. Chow) issued Jan. 2, 2001, 6,171,067 (J. Wallace Parce) issued Jan. 9, 2001, 6,171,850 (Robert Nagle et al.) issued Jan. 9, 2001, 6,172,353 (Morten J. Jensen) issued Jan. 9, 2001, 6,174,675 (Calvin Y. H. Chow et al.) issued Jan. 16, 2001, 6,182,733 (Richard J. McReynolds) issued Feb. 6, 2001, 6,186,660 (Anne R. Kopf-Sill et al.) issued Feb. 13, 2001, 6,221,226 (Anne R. Kopf-Sill) issued Apr. 24, 2001, 6,233,048 (J. Wallace Parce) issued May 15, 2001, 6,235,175 (Robert S. Dubrow et al.) issued May 22, 2001, 6,235,471 (Michael Knapp et al.) issued May 22, 2001, 6,238,538 (J. Wallace Parce et al.) issued May 29, 2001, and 6,251,343 (Robert S. Dubrow et al.) issued Jun. 26, 2001.

Systems adapted for use with the devices of the present invention are also described in, e.g., various published PCT applications, including WO 98, 2000231, WO 98, 2000705, WO 98, 2000707, WO 98/02728, WO 98/05424, WO 98/22811, WO 98/45481, WO 98/45929, WO 98/46438, and WO 98/49548, WO 98/55852, WO 98/56505, WO 98/56956, WO 99, 2000649, WO 99/10735, WO 99/12016, WO 99/16162, WO 99/19056, WO 99/19516, WO 99/29497, WO 99/31495, WO 99/34205, WO 99/43432, WO 99/44217, WO 99/56954, WO 99/64836, WO 99/64840, WO 99/64848, WO 99/67639, WO 00/07026, WO 00/09753, WO 00/10015, WO 00/21666, WO 00/22424, WO 00/26657, WO 00/42212, WO 00/43766, WO 00/45172, WO 00/46594, WO 00/50172, WO 00/50642, WO 00/58719, WO 00/60108, WO 00/70080, WO 00/70353, WO 00/72016, WO 00/73799, WO 00/78454, WO 01/02850, WO 0/14865, WO 01/17797, and WO 01/27253.

In preferred aspects, the body structure of the microfluidic devices incorporates a planar or "chip" structure. The devices described herein typically comprise an aggregation of two or more separate layers which when appropriately mated or joined together, form the body structure of the microfluidic device of the invention, e.g., containing the channels and/or chambers described herein. Typically, the microfluidic devices described herein will comprise a top portion, a bottom portion, and an interior portion, wherein the interior portion substantially defines the channels and chambers of the device. See, e.g., FIG. 1.

A variety of substrate materials are optionally employed as the bottom portion. Typically, because the devices are microfabricated, substrate materials will be selected based upon their compatibility with known microfabrication techniques, e.g., photolithography, wet chemical etching, laser ablation, reactive ion etching (RIE), air abrasion techniques, injection molding, LIGA methods, metal electroforming, embossing, and other techniques. Suitable substrate materials are also generally selected for their compatibility with the full range of conditions to which the microfluidic devices may be exposed, including extremes of pH, temperature, salt concentration, and application of electric fields. Accordingly, in some preferred aspects, the substrate material may include materials normally associated with the semiconductor industry in which such microfabrication techniques are regularly employed, including, e.g., silica based substrates, such as glass, quartz, silicon or polysilicon, as well as other substrate materials, such as gallium arsenide and the like. In the case of semiconductive materials, it will often be desirable to provide an insulating coating or layer, e.g., silicon oxide, over the substrate material, and particularly in those applications where electric fields are to be applied to the device or its contents. In preferred aspects, the substrates used to fabricate the body structure are silica-based, and more preferably glass or quartz, due to their inertness to the conditions described above, as well as the ease with which they are microfabricated. When manifold components are fabricated from these materials and/or using these techniques, many of these considerations are equally applicable.

In alternate preferred aspects, especially with respect to manifold component layers (discussed above), the substrate materials comprise polymeric materials, e.g., plastics, such as polymethylmethacrylate (PMMA), polycarbonate, polytetrafluoroethylene (TEFLON™), polyvinylchloride (PVC), polydimethylsiloxane (PDMS), polysulfone, polystyrene, polymethylpentene, polypropylene, polyethylene, polyvinylidine fluoride, acrylonitrile-butadiene-styrene copolymer (ABS), and the like. Such polymeric substrates are readily manufactured using available microfabrication techniques, as described above, or from microfabricated masters, using well known molding techniques, such as injection molding, embossing or stamping, or by polymerizing the polymeric precursor material within the mold (see U.S. Pat. No. 5,512,131). Again, such polymeric substrate materials are preferred for their ease of manufacture, low cost and disposability, as well as their general inertness to most extreme reaction conditions. Again, these polymeric materials may include treated surfaces, e.g., derivatized or coated surfaces, to enhance their utility in the microfluidic system, e.g., provide enhanced fluid direction, e.g., as described in U.S. Pat. No. 5,885,470, and which is incorporated herein by reference in its entirety for all purposes.

In the embodiment shown in FIG. 1, upper layer 102 of body structure 100, includes plurality of ports 106 disposed through it. As indicated, these ports are positioned to communicate with specific points of the channels or grooves 110, e.g., the termini, in the aggregate body structure when the upper and lower layers are mated. Ports 106 function to provide fluid access to the channels of the device, e.g., interfacing with manifold channel termini and/or apertures, and in certain aspects, electrical access to the channels within the body structure (e.g., when bulk viscosity enhancers and electrolytes are disposed within manifold structures for the delivery of electrical fields to selected ports, etc.). As discussed further above, rings are optionally molded around (i.e., surround) one or more of the plurality of ports on the upper surface of the upper layer of the body structure. Additionally, at least a portion of the ports also optionally includes a conductive coating so that electrical communication is optionally achieved in the device without placing electrodes directly into, e.g., the ports. The use of conductive coatings is also described further above.

In many embodiments, the microfluidic devices include an optical detection window disposed across one or more channels and/or chambers of the device. Optical detection windows are typically transparent such that they are capable of transmitting an optical signal from the channel/chamber over which they are disposed. Optical detection windows may merely be a region of a transparent layer of the body structure, e.g., where the layer is glass or quartz, or a transparent polymer material, e.g., PMMA, polycarbonate, etc. Alternatively, where opaque substrates are used in manufacturing the devices, transparent detection windows fabricated from the above materials may be separately manufactured into the device.

Microfluidic devices may be used in a variety of applications, including, e.g., the performance of high throughput screening assays in drug discovery, immunoassays, diagnostics, genetic analysis, and the like. As such, the devices described herein, will often include multiple sample introduction ports or reservoirs, for the parallel or serial introduction and analysis of multiple samples, e.g., using the manifolds described herein. These devices are also optionally coupled to a sample introduction port, e.g., a pipettor, which serially introduces multiple samples into the device for analysis. Examples of such sample introduction systems and other high throughput configurations are described in, e.g., U.S. Pat. Nos. 6,046,056 and 5,880,071, each of which is hereby incorporated by reference in its entirety for all purposes. As discussed above, the invention also includes methods and devices that utilize membranes for sieving aggregations of material (e.g., clumps of cells, reagents, or other particles) and otherwise delivering reagents or other materials into the ports of the devices.

Flow of Reagents in Manifolds and Microscale Systems

The microfluidic devices of the invention optionally include flowing a fluid in the manifold channels, apertures, microchannel networks, or other device cavities using various fluid direction components that optionally include, e.g., a fluid pressure force modulator, an electrokinetic force modulator, a capillary force modulator, a gravity force modulator, a magnetic force modulator, a dielectrophoretic force modulator, a fluid wicking element, or the like. The fluid direction components used to induce fluid movement in manifolds and underlying microfluidic device body structures are optionally the same or different. These as well as other fluid movement techniques which are optionally adapted to the devices disclosed herein are described in greater detail in the references cited and incorporated herein.

In preferred embodiments, fluid is flowed in the manifold channel network using a first gravity force modulator and in the at least one microchannel network using alternative fluid direction components that also optionally include a fluid pressure force modulator, an electrokinetic force modulator, a capillary force modulator, a second gravity force modulator, a magnetic force modulator, a dielectrophoretic force modulator, a fluid wicking element, or the like. The first and second gravity force modulator are optionally the same. As mentioned, one advantage of the invention is that the interface of certain equipment hardware, such as the various fluid direction components, with existing devices does not need to be modified to accommodate the use of manifolds.

The application of a pressure differential along a channel (e.g., a manifold channel, a microchannel, or the like) is carried out by a number of means. For example, in a simple passive aspect, reagents are loaded into a manifold aperture at a sufficient volume or depth, such that the reagent sample creates a hydrostatic pressure differential along the length of, e.g., an intersecting manifold channel such that flow is induced through the manifold channel to, e.g., one or more ports disposed in the surface of an underlying body structure. Typically, the aperture volume is quite large in comparison to the volume or flow through rate of the intersecting channel, e.g., 100 μl or larger volume apertures vs. 10000 $μm^2$ channel cross-section. As such, over the time course of the assay, the flow rate of the reagents will remain substantially constant, as the volume of within the aperture, and thus, the hydrostatic pressure changes very slowly. Applied pressure is then optionally readily varied to yield different reagent flow rates through the manifold channels in the manifold and, e.g., the microchannels within the body structure. In screening applications, varying the flow rate of the reagents is optionally used to vary the incubation time of the reagents. In particular, by slowing the flow rate along the channel, one can effectively lengthen the amount of time between introduction of reagents and detection of a particular effect. Alternatively, analysis channel lengths (in the body structure), manifold channel lengths, detection points, or reagent introduction points are varied in the device fabrication to vary incubation times.

In many applications, it may be desirable to provide relatively precise control of the flow rate of reagents, e.g., to precisely control incubation or separation times, etc. As such, in many preferred aspects, flow systems that are more active than hydrostatic pressure driven systems are employed. For example, reagents are optionally flowed by applying a pressure differential across the length of a manifold channel and/or an analysis channel in a body structure. For example, a pressure source (positive or negative) is optionally applied at a manifold aperture to force the reagents through the manifold channel and into an underlying body structure. The pressure source is optionally pneumatic, e.g., a pressurized gas, or a positive displacement mechanism, i.e., a plunger fitted into an aperture, for forcing the reagents through the device cavities. Alternatively, a vacuum source is applied to a manifold aperture at one end of a channel network to draw reagents from another aperture in fluid communication with an opposite end of the network. Pressure or vacuum sources are optionally supplied external to the device or system, e.g., external vacuum or pressure pumps sealably fitted to the inlet or outlet of a manifold channel or an a microchannel (e.g., for interchangeable manifold devices), or they may be internal to the device, e.g., microfabricated pumps integrated into the device and operably linked to a manifold channel or a microchannel. Examples of microfabricated pumps have been widely described in the art. See, e.g., published International Application No. WO 97/02357.

In alternate aspects, other flow systems are employed in transporting reagents through device channels. One example of such alternate methods employs electrokinetic forces to transport the reagents. Electrokinetic transport systems typically utilize electric fields applied along the length of channels (e.g., manifold channels, microchannels, or the like) that have a surface potential or charge associated therewith. When fluid is introduced into the channel, the charged groups on the inner surface of the particular channel ionize, creating locally concentrated levels of ions near the fluid/surface interface. Under an electric field, this charged sheath migrates toward the cathode or anode (depending upon whether the sheath comprises positive or negative ions) and pulls the encompassed fluid along with it, resulting in bulk fluid flow. This flow of fluid is generally termed electroosmotic flow. Where the fluid includes reagents, the reagents are also pulled along. A more detailed description of controlled electrokinetic material transport systems in microfluidic systems is described in published International Patent Application No. WO 96/04547, which is incorporated herein by reference.

Hydrostatic, wicking and capillary forces are also optionally used to provide for fluid flow. See, e.g., "Method and Apparatus for Continuous Liquid Flow in Microscale Channels Using Pressure Injection, Wicking and Electrokinetic Injection," by Alajoki et al., U.S. Ser. No. 09/245,627, filed Feb. 5, 1999. In these methods, an adsorbent material or branched capillary structure is placed in fluidic contact with a region where pressure is applied, thereby causing fluid to move towards the adsorbent material or branched capillary structure.

While the foregoing invention has been described in some detail for purposes of clarity and understanding, it will be clear to one skilled in the art from a reading of this disclosure that various changes in form and detail can be made without departing from the true scope of the invention. For example, all the techniques and apparatus described above may be used in various combinations. All publications, patents, patent applications, or other documents cited in this application are incorporated by reference in their entirety for all purposes to the same extent as if each individual publication, patent, patent application, or other document were individually indicated to be incorporated by reference for all purposes.

What is claimed is:

1. A microfluidic device, comprising:
   a body structure comprising at least one microchannel network and a plurality of ports disposed in the body structure, at least one port being in fluid communication with at least one microchannel in the at least one microchannel network, the body structure configured for use with a first fluid direction means; and,
   a manifold comprising at least one manifold channel network and at least one aperture disposed in the manifold, the at least one aperture being in fluid communication with at least one manifold channel in the manifold channel network, the manifold configured for use with a second fluid direction means, the second fluid direction means being different from the first fluid direction means, the manifold being mated with the body structure, whereby the at least one aperture or one or more manifold channels in the manifold channel network is in fluid communication with the at least one port in fluid communication with the at least one microchannel in the at least one microchannel network.

2. The microfluidic device of claim 1, wherein the at least one aperture is in fluid commnuncation with two or more manifold channels, wherein at least two of the two or more manifold channels fluidly communicates with a different port.

3. The microfluidic device of claim 1, wherein the at least one microchannel network disposed in the body structure extends in a substantially planar dimension and wherein the at least one manifold channel network disposed in the manifold comprises channels extending both horizontally and vertically within the manifold.

4. The microfluidic device of claim 1, wherein the at least one microchannel network and the at least one manifold channel network extend in at least horizontal and vertical planes.

5. The microfluidic device of claim 1, wherein at least one manifold channel in the at least one manifold channel network disposed in the manifold comprises at least one cross-sectional dimension of at least about 5 mm, 10 mm, 50 mm, 100 mm, 250 mm, 500 mm, 1,000 mm, 5,000 mm, or more.

6. The microfluidic device of claim 1, further comprising at least one additional aperture or manifold channel in fluid communication with the at least one aperture, with the at least one or another manifold channel network, or with the at least one port, for venting air when the device is loaded with one or more reagents or filled with another fluidic material.

7. The mircofluidic device of claim 1, wherein the at least one manifold channel network and the at least one aperture further comprise at least one bulk viscosity enhancer and at least one electrolyte disposed therein for inducing low electrical resistance within the device.

8. The mircofluidic device of claim 1. further comprising a controiler/detector apparatus configured to receive the mircofluidic device, the controller/detector apparatus comprising an optical or an electrochemical detection system and a material transport system, the detection system and the transport system being operably interfaced with the mircofluidic device.

9. The microfluidic device of claim 1, further comprising two or more manifolds, wherein each of the two or more manifolds interchangeably mates with the body structure for distributing at least one fluid to one or more of the plurality of ports in the body structure.

10. The microfluidic device of claim 9, further comprising a controller/detector apparatus configured to interchangeably receive the body structure or each of the two or more manifolds, the controller/detector apparatus comprising at least an optical or an electrochemical detection system, a material transport system, and a body structure or manifold interchange system, the detection system, the transport system, and the body structure or manifold interchange system being operably interfaced with the microfluidic device.

11. The microfluidic device of claim 1, further comprising two or more body structures, wherein each of the two or more body structures interchangeably mates with the manifold for distributing at least one fluid to one or more of the plurality of ports in the body structure.

12. The microfluidic device of claim 11, further comprising a controller/detector apparatus configured to interchangeably receive the two or more body structures or the manifold, the controller/detector apparatus comprising at least an optical or an electrochemical detection system, a material transport system, and a body structure or manifold interchange system, the detection system, the transport system, and the body structure or manifold interchange system being operably interfaced with the microfluidic device.

13. The microflidic device of claims 8, 10, or 12, wherein the controller/detector apparatus is automatic.

14. The mircofluidic device of claim 1, wherein the body structure and the manifold are integrated.

15. The microfluidic device of claim 14, wherein each of the body structure and the manifold separately comprise at least a first surface, the plurality of ports being disposed in the first surface of the body structure, and the at least one aperture or the one or more manifold channels in the manifold channel network being disposed in the first surface of the manifold, the first surface of the manifold upon integration being mated to the first surface of the body structure such that the at least one aperture or the one or more manifold channels in the at least one manifold channel network are in fluid communication with the plurality of ports disposed in the body structure.

16. The microfluidic device of claim 15, wherein the first surface of the body structure and the first surface of the manifold are planar.

17. The microfluidic device of claim 1, wherein the first and second fluid direction means comprise one or more of a fluid pressure force modulator, an electrokinetic force modulator, a capillary force modulator, a gravity force modulator, a magnetic force modulator, a dielectrophoretic force modulator, or a fluid wicking element.

18. The mircofiuldic device of claim 17, wherein the second fliud direction means comprises a gravity force modulator, and the first fluid direction means comprises one or more of a fluid pressure force modulator, an electrokinetic force modulator, a capillary force modulator, a magnetic force modulator, a dielectrophoretic force modulaor, or a fluid wicking element.

19. The microfluidic device of claim 15, wherein the manifold further comprises at least a first alignment structure for aligning the body structure on the first surface of the manifold.

20. The mircofluidic device of claim 15, further comprising at least one semi-permeable membrane portion disposed between at least a portion of the first surface of the manifold and the first surface of the body structure when the first surface of the manifold and the first surface of the body structure are mated, such. that the at least one semi-permeable membrane portion is disposed between the at least one aperture or the one or more manifold channels in the at least one manifold channel network and the plurality of ports disposed in the body structure.

21. The microfluidic device of claim 15, wherein the first surface of the manifold is mated to the first surface of the body structure using one or more of:

adhesion, heat lamination, bonding, welding, or clamping.

22. The microfluidic device of claim 15, further comprising one or more of:

each of the plurality of ports further comprising a rim disposed circumferentially around each port in the first surface of the body structure and an internal surface, wherein at least a portion of the rim and the internal surface of at least one of the plurality of ports comprises a conductive coating; or, at least one ring, wherein the at least one ring is disposed between the manifold and the body structure and circumferentially around the at least one aperture when the at least one aperture is aligned with at least one of the plurality of ports in the body structure; or, a gasket disposed between at least a portion of the first surface of the manifold and the first surface of the body structure.

23. The mircofluidic device of claim 15, the manifold further comprising a second surface opposite the first surface, wherein the at least one aperture is disposed in the second surface and in fluid communication with the at least one manifold channel in the manifold channel network.

24. The microfluidic device of claim 23, wherein the second and etching.

25. The microfluidic device of claim 23, wherein the at least one aperture comprises a depth of at least about 1 mm, 5 mm, 10 mm, 100 mm, or more.

26. The microfluidic device of claim 23, wherein the at least one aperture comprises a volume of at least about 1 ml, 10 ml, 100 ml, 1,000 ml, or more.

27. The microfluidic device of claim 23, wherein the at least one aperture further comprises a rim disposed circumferentially around the at least one aperture in the second surface and an internal surface, wherein at least a portion of the rim and the internal surface of the at least one aperture comprise a conductive coating.

28. The microfluidic device of claim 1, wherein the manifold comprises two or more layers.

29. The microfluidic device of claim 28, wherein the two or more layers are bonded, adhered, welded, or clamped together.

30. The microfluidic device of claim 28, wherein the two or more layers are fabricated from at least one polymeric, glass, or ceramic material.

31. The microfluidic device of claim 28, wherein at least two of the two or more layers are fabricated from different polymeric, glass, or ceramic materials.

32. The microfluidic device of claim 28, wherein the two or more layers are approximately the same thickness.

33. The microfluidic device of claim 28, wherein at least two of the two or more layers are different thicknesses.

34. The microfluidic device of claim 28, wherein at least one of the two or more layers of the manifold comprises a thickness of at least about 1 mm, 10 mm, 100 mm, 1 mm, 5 mm, 1 cm, or more.

35. The microfluidic device of claim 28, wherein the manifold comprises at least about 3, or at least about 5, or at least about 10 layers in which the at least one manifold channel network and the at least one aperture are disposed.

36. The microfluidic device of claims 1 or 28, wherein the manifold or the two or more layers of the manifold are fabricated using a process selected from one or more of: injection molding, cast molding, compression molding, extrusion, embossing, and etching. and etching.

\* \* \* \* \*